UNITED STATES PATENT OFFICE.

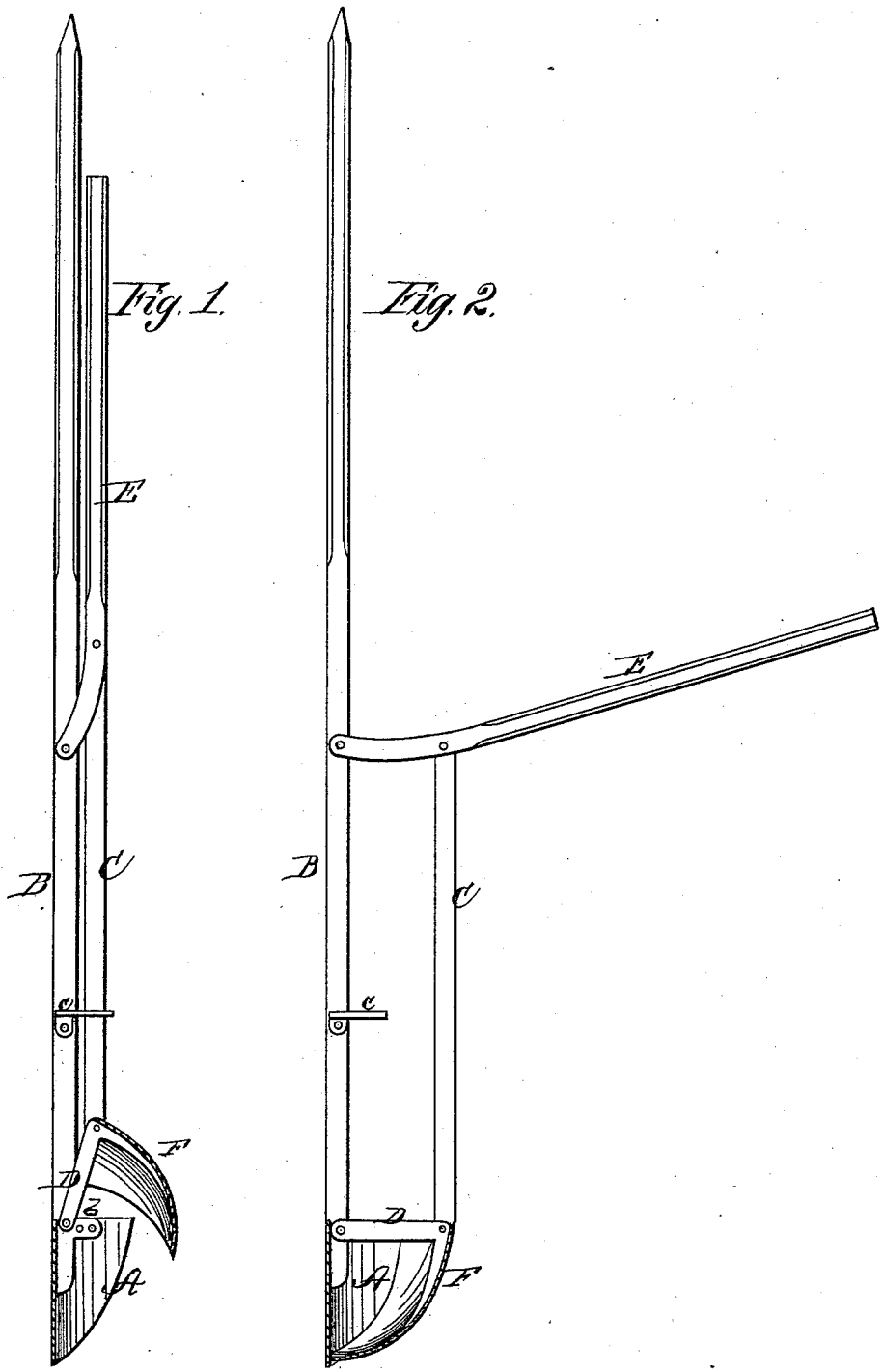

JOHN SCHEIDLER, OF COLDWATER, MICHIGAN.

POST-HOLE DIGGER.

SPECIFICATION forming part of Letters Patent No. 226,118, dated March 30, 1880.

Application filed January 27, 1880.

*To all whom it may concern:*

Be it known that I, JOHN SCHEIDLER, of Coldwater, in the county of Branch and State of Michigan, have invented certain new and useful Improvements in Post-Hole Diggers; and I do hereby declare that the following is a full, clear, and exact description thereof, reference being had to the accompanying drawings, and to the letters of reference marked thereon, which form part of this specification, in which—

Figure 1 is a side elevation of my post-hole digger with the shovels partly in section and in position for digging; and Fig. 2, a side elevation of the same with the shovels in position for raising the dirt from the hole.

My invention has for its object the digging of holes; and to this end it consists in the combination of the several devices hereinafter fully set forth, and which will be more specifically stated in the claim.

To enable others skilled in the art to which my invention appertains to make and use the same, I will now proceed to describe its construction and operation.

A represents a shovel secured to the lower end of the bar B, which is, on its inner side, just above the top of the shovel A, provided with a projection or short arm, $b$, in which is a series of small holes, whose use will be more fully seen hereinafter.

C represents a short bar, which is connected at its top end to bar B by means of the pivoted lever E, and at its bottom by pivoted lever D.

Lever E is pivoted to both bars B C, its short arm being of the same length as the connection D.

The outer end of the connection D is bent downward and soldered to the inner side of scoop F, thus forming a brace to it.

The scoop and shovel are of such shape that when pressed down their inner edges will come in contact and hold the earth securely between them. The bar B is also provided with one or more foot-rests, $c$, for forcing the shovel into the ground.

In operation the device is raised in the position shown in Fig. 1, and the shovel forced into the ground by placing one foot on one of the rests $c$. When it has reached a suitable depth the pressure-lever E is thrown outward and downward, thereby causing the scoop F to cut the hole of the proper shape and forcing its point under the detached earth, clasping it securely while it is being lifted out and to one side, when the pressure-lever is thrown up, thus discharging the earth held between the shovel and scoop.

When a larger hole is required the pivot of the inner end of arm D is moved into one of the holes in the projection $b$, and the scoop being thus thrown farther from the shovel describes a greater circle and forms a hole of greater diameter.

The upper end of the bar B may be made pointed, as shown, to more readily be used in detaching stones, &c., which interfere with the operation of the device.

I am well aware that it is not new to have inclosing-shovels at the bottom of two bars pivoted together, and therefore do not claim such a device broadly.

Having thus fully described my invention, what I claim as new, and desire to secure by Letters Patent, is—

In a post-hole digger, the combination of bar B, provided with foot-rest $c$ and shovel A, pivoted lever E, pivoted scoop D F, and parallel connecting-bar C, substantially as shown and described.

In testimony that I claim the foregoing as my own I affix my signature in presence of two witnesses.

JOHN SCHEIDLER.

Witnesses:
D. THOMPSON,
A. WHITEHEAD.